(12) United States Patent
Bartos et al.

(10) Patent No.: US 6,408,869 B1
(45) Date of Patent: Jun. 25, 2002

(54) SAFETY VALVE

(75) Inventors: Josef A. Bartos, Pomona; Harsharan Grewal, Diamond Bar, both of CA (US)

(73) Assignee: GAAP Gas Control Inc., Pomona, CA (US)

( * ) Notice: Subject to any disclaimer, the term of this patent is extended or adjusted under 35 U.S.C. 154(b) by 0 days.

(21) Appl. No.: 09/895,705

(22) Filed: Jul. 2, 2001

Related U.S. Application Data

(60) Provisional application No. 60/223,335, filed on Aug. 7, 2000.

(51) Int. Cl.$^7$ .................... F16K 31/34; F16K 31/385
(52) U.S. Cl. .................... 137/414; 137/430; 137/446; 141/198
(58) Field of Search .................... 137/413, 414, 137/442, 443, 444, 446, 430; 141/198

(56) References Cited

U.S. PATENT DOCUMENTS

| | | | | |
|---|---|---|---|---|
| 1,896,421 A | * | 2/1933 | Quivey | 137/430 |
| 2,213,753 A | * | 9/1940 | Teahen | 137/414 |
| 2,442,927 A | | 6/1948 | Horvath | |
| 2,491,521 A | * | 12/1949 | Samiran | 137/414 |
| 2,578,745 A | * | 12/1951 | Samiran | 137/414 |
| 2,620,818 A | | 12/1952 | Symmons | |
| 2,623,726 A | * | 12/1952 | Suska | 137/414 |
| 2,685,301 A | | 8/1954 | Dreier | |
| 2,811,169 A | * | 10/1957 | Buchanan | 137/414 |
| 2,843,145 A | * | 7/1958 | Koehler et al. | 137/414 |
| 2,855,949 A | * | 10/1958 | Sterner et al. | 137/414 |
| 3,429,333 A | | 2/1969 | Schoepe et al. | |
| 3,717,170 A | * | 2/1973 | McRae | 137/430 |
| 3,895,645 A | | 7/1975 | Johnson | |
| 3,929,155 A | * | 12/1975 | Garretson | 137/430 |
| 4,065,095 A | | 12/1977 | Johnson | |
| 4,305,422 A | * | 12/1981 | Bannink | 137/430 |
| 4,341,238 A | * | 7/1982 | Roosa et al. | 137/414 |
| 4,420,845 A | | 12/1983 | Antunez | |
| 4,444,230 A | * | 4/1984 | Van Mullem | 137/430 |
| 5,487,404 A | * | 1/1996 | Kerger | 137/446 |
| 5,685,331 A | * | 11/1997 | Westermeyer | 137/430 |
| 5,738,141 A | * | 4/1998 | Blanke et al. | 137/414 |
| 5,921,272 A | * | 7/1999 | Cavagna | 137/414 |
| 6,076,546 A | | 6/2000 | Waters | |
| 6,138,709 A | * | 10/2000 | Home | 137/446 |
| 6,178,994 B1 | * | 1/2001 | Park | 137/446 |
| 6,230,730 B1 | * | 5/2001 | Garretson | 137/430 |
| 6,332,745 B1 | * | 12/2001 | Brougham | 137/430 |

* cited by examiner

*Primary Examiner*—George L. Walton
(74) *Attorney, Agent, or Firm*—Vickers, Daniels & Young

(57) ABSTRACT

A liquid level responsive shut-off valve for filling a tank, such as a liquid propane tank, comprises a valve housing having an inlet passageway for connection to a source of liquid under pressure, an outlet passageway opening into the tank, and a diaphragm actuated valve element having open and closed positions respectively opening and closing. the inlet passageway to the flow of liquid therethrough to the outlet passageway and tank. A float operated valve element controls operation of the diaphragm actuated valve element and has a closed position when the tank is initially filled which precludes the flow of liquid into the tank thereafter, even when the tank becomes empty, until the liquid supply pressure is reduced to atmosphere.

5 Claims, 3 Drawing Sheets

SAFETY VALVE

This application claims the benefit of the filing date of U.S. Provisional Application Ser. No. 60/223,335 filed Aug. 7, 2000 entitled Safety Valve.

FIELD OF THE INVENTION

The invention relates to a valve assembly, and more particularly a valve assembly for a tank to prevent the overfilling of a tank.

BACKGROUND OF THE INVENTION

There have been a number of valves developed to prevent the fluid level in tanks from exceeding a predetermined level. When using tanks filled with compressed or liquified gas, such as propane, it is important that the compressed or liquified gas not exceed a certain fluid level in the tank so that a sufficient amount of head space at the top of the tank is maintained for safety purposes. Due to the high co-efficient of thermal expansion of many liquified gases, an increase in ambient temperature can cause the head space in the tank to be rapidly consumed. These tanks are rated so as to withstand a predetermined amount of internal pressure; however, if the tank is overfilled beyond the maximum level, there is a danger that the internal pressure may exceed the rated strength of the tank which could lead to a failure in the tank.

Many devices have been designed to avoid overfilling of such tanks. One such device includes the use of a dip tube that extends through the tank wall to a specific level below the maximum fluid level such that one end of the tube is open to atmosphere. Thus, once the fluid level in the tank reaches the bottom end of the tube, the liquified gas is evacuated from the tank. Other devices that have been used incorporate the use of a primary valve member and a secondary valve member controlled by a float assembly. The primary valve blocks incoming fluid flow when the flow assembly is operable at maximum fluid conditions to seat the secondary valve. When the secondary valve seals its associated port, there is a fluid pressure build up between the secondary and primary valve that pushes the primary valve into its seat sealing lateral ports to stop fluid flow into the tank. Another type of float device as disclosed in U.S. Pat. No. 6,076,546 to Waters, includes a valve member which shifts in a valve housing controlled by the rising-and falling of a float assembly as the fluid level in the vessel rises and falls. The valve member shifts into a blocking position relative to a port in the housing that communicates with the tank interior at a predetermined maximum fluid level in the interior space. When the fluid level in the tank is below the maximum fluid level, the float assembly shifts the valve member from the blocking position and keeps it removed from the flow of fluid between the flow path and the port. Recently, new regulations have been drafted which require the overfill valve to prevent further filling of the tank until the tank is emptied of fluid. Specifically UL 2227 dated Nov. 19, 1999, which is incorporated herein by reference, requires that LP-Gas container, after initially being shut off, shall not reopen to grant an increase of more than two percent when test at pressures of 15 psig and 125 psig. Prior valves have prevented overfilling the tank once a maximum liquid level has been reached; however the valves allow refilling of the tank once the liquid level in the tank has dropped below the maximum liquid. Accordingly, there is a need for a simple, inexpensive valve which prevents the overfilling of tanks beyond a predetermined level in the tank and also prevents refilling the tank until the fluid in the tank has been substantially evacuated from the interior of the tank, and which complies with present day overfilling requirements.

SUMMARY OF THE INVENTION

In accordance with the principal aspect of the present invention, a valve assembly is provided which prevents fluid flow into a vessel, such as an LP tank, once a predetermined maximum fluid level in the tank has been reached. In one embodiment, the valve assembly is also designed to prevent further filling of the tank after a predetermined maximum fluid level in the tank has been reached until after the fluid level has dropped to a predetermined lower liquid level and the supply pressure to the valve assembly has dropped below a predetermined pressure. In one specific embodiment, the predetermined lower liquid level is the level of the liquid in the tank when the tank is empty or substantially empty of all fluid. Such a predetermined lower liquid level is typically selected for highly volatile liquids. Highly volatile liquids are defined as liquids having a boiling point of less than about 100° F. Such liquids include, but not limited to, butane, hydrogen, oxygen, propane, and the like. As can be appreciated, a tank including a non-highly volatile liquid can also have the predetermined lower liquid level set for a level at which the liquid in the tank is empty or substantially empty of all fluid. As can also be appreciated, tanks that contain highly volatile liquids can have the predetermined lower liquid level set at a low level when the liquid in the tank is not completely empty of all fluid. With further regard to this embodiment, the valve assembly prevents filling of the tank after the predetermined lower fluid level in the tank has been reached until the supply pressure in the valve assembly has dropped to atmospheric pressure, namely 14.7 psi. The atmospheric pressure level is preferred for highly volatile liquids, but a tank including a non-highly volatile liquid can also have atmospheric pressure as the predetermined lower inlet pressure level for the valve assembly to open and allow filling of the tank. As can also be appreciated, valve assemblies for tanks that contain highly volatile liquids can have the predetermined lower pressure level set at a pressure above atmospheric pressure. The valve assembly is particularly designed for use with liquified gas tanks such as, but not limited to, LP tanks.

A primary object of the present invention is the provision of a safety valve that prevents the overfilling of a tank with liquid under pressure.

Another object of the invention is the provision of a safety valve that prevents further filling of a tank once a predetermined maximum fluid level is reached in the tank during filling of the tank.

Still another object of the invention is the provision of a safety valve that prevents refilling of the tank once a predetermined maximum fluid level is obtained in the tank until after the supply pressure to the valve is reduced to a predetermined low pressure.

Still another object of the invention is the provision of a safety valve for use on LP tanks.

A further object of the invention is the provision of a safety valve that allows for rapid filling of the tank.

Still another object of the invention is the provision of a safety valve which is economical to produce and efficient and reliable in operation.

BRIEF DESCRIPTION OF THE DRAWINGS

The foregoing and other objects and advantages will become apparent to those skilled in the art upon the reading the following description in conjunction with the accompanied drawings in which.

DETAILED DESCRIPTION OF A PREFERRED EMBODIMENT

Figure 1:
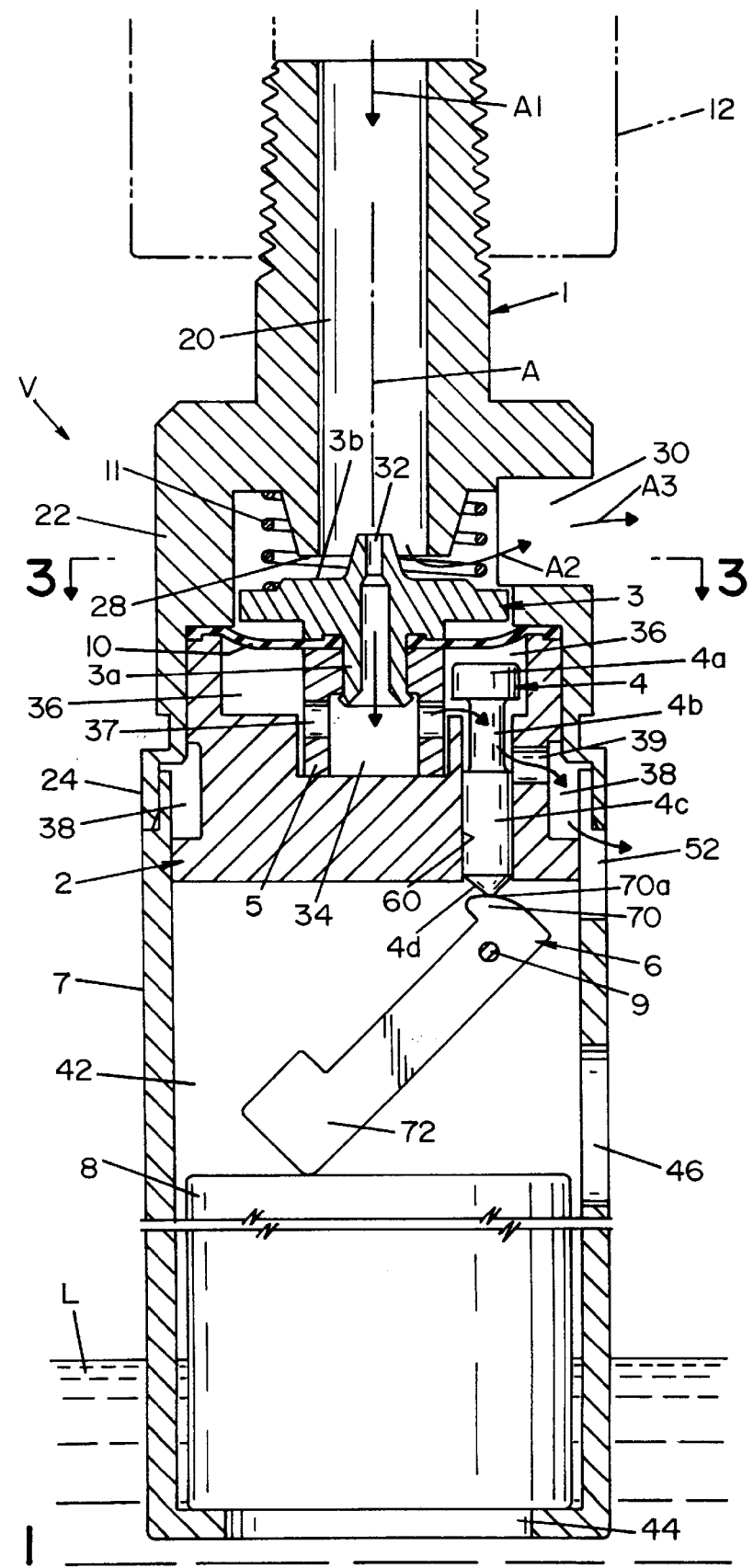
FIG. 1 is an elevation view, in section, of a safety valve according to the invention and in which the valve is open.
Figure 2:
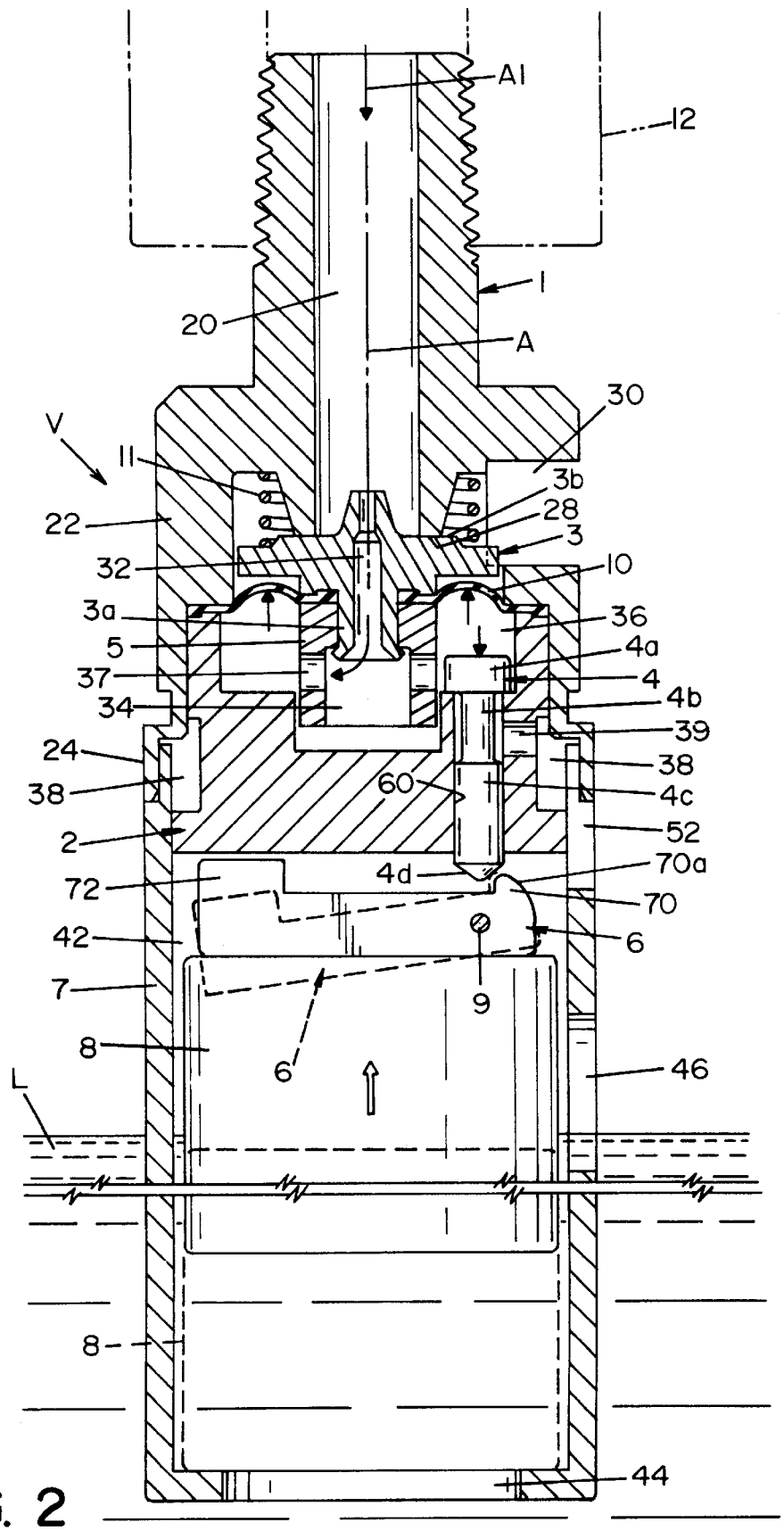
FIG. 2 is an elevation view, in section, similar to FIG. 1 and showing the valve closed; and, FIG. 3 is a cross-sectional view of the valve taken along line 3—3 in FIG. 1.
Figure 3:
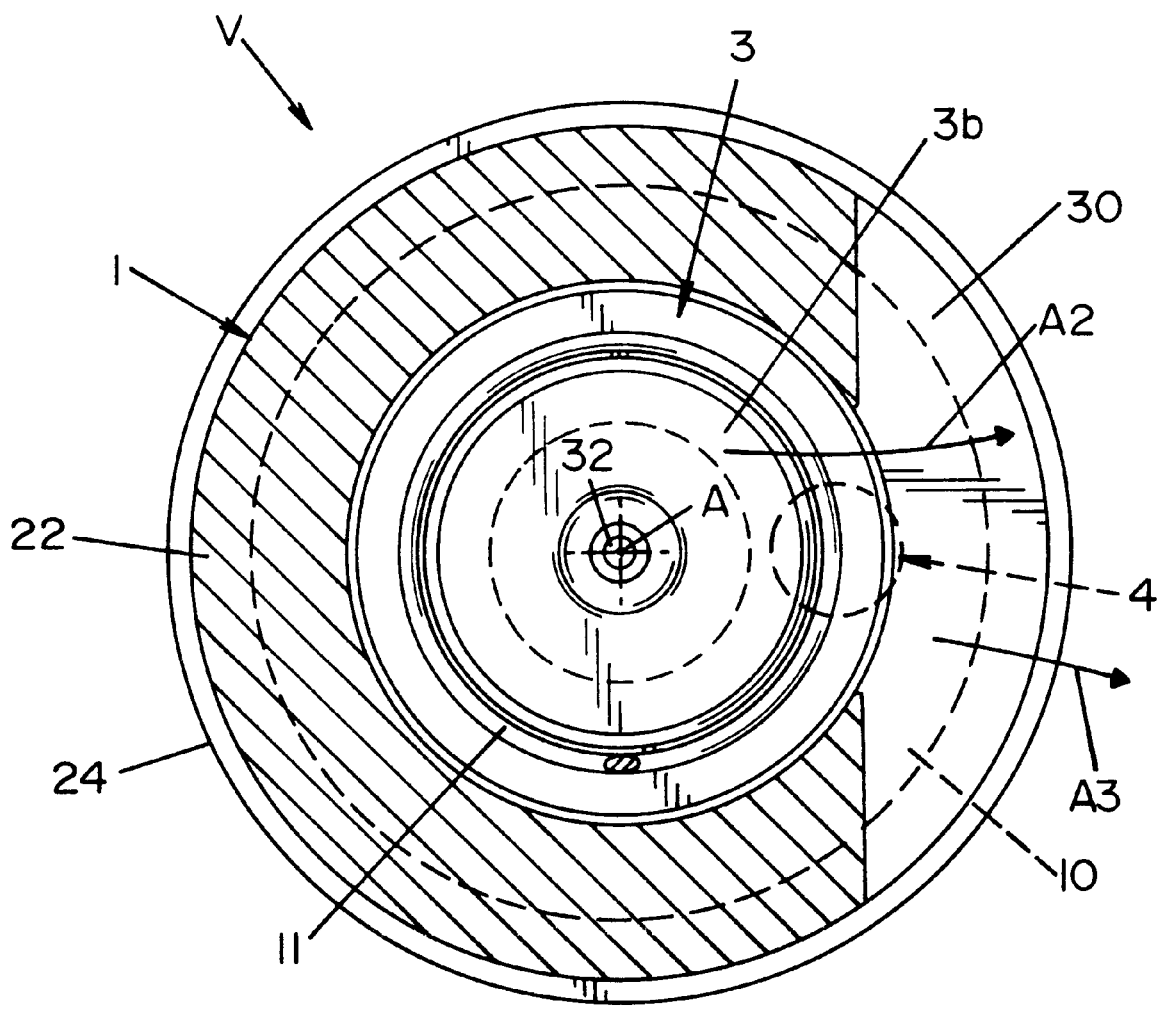

Referring now to the drawings, wherein the showings are for the purpose of illustrating a preferred embodiment of the invention only and not for the purpose of limiting the invention, FIGS. 1–3 illustrate a safety valve assembly V according to the invention, the component parts of which assembly are shown in the open position of the valve in FIG. 1 and in the closed position of the valve in FIG. 2. As illustrated in FIGS. 1–3, valve assembly V includes an upper valve body 1, a lower valve body 2, a valve element 3 mounted therebetween as set forth more fully hereinafter, a vent valve element 4, and a float unit for actuating the latter and comprising a float retainer tube 7, a float 8 in the latter, and a lever arm 6 mounted on retainer 7 by a pivot pin 9 for displacement about the latter in response to the position of the float to control the position of valve element 4 as will become apparent hereinafter. Valve element 3 includes a stem 3a which extends through a mounting diaphragm 10 to which the valve element is secured by a retainer 5 engaging against the underside of the diaphragm, and valve element 3 is mounted on the valve housing by axially capturing the peripheral edge portion of the diaphragm between upper and lower valve bodies 1 and 2. The upper end of valve body 1 is externally threaded to be received in a fitting 12 which is used to position the valve assembly at a proper depth in a tank, not shown in detail, such as a tank for containing a liquid L under pressure, such as liquid propane.

Valve assembly V has an axis A and upper valve body 1 includes an axially extending inlet passageway 20 having an inner end which terminates in a radially outwardly extending circumferential seating surface 28 overlying the upper side 3b of valve element 3, and the latter valve element is biased downwardly from the closed position shown in FIG. 2 towards the open position shown in FIG. 1 by a coil spring 11 between the upper side of the valve element and the lower end of the portion of valve body 1 providing the outlet end of passageway 20. When valve element 3 is displaced downwardly from seat surface 28 as shown in FIG. 1, liquid flowing through inlet passageway 20, as indicated by arrows A1, A2 and A3, flows downwardly through passageway 20, radially outwardly across surface 28 and valve element 3 and through an outlet opening 30 in upper valve body 1 into the tank.

Upper valve body 1 includes a peripheral skirt 22 having a lower end 24 which extends about lower valve body 2 and receives the upper end of float retainer tube 7. The upper and lower valve bodies are suitably interconnected such as by a press fit therebetween, and the retainer tube and upper valve body 1 are suitably interconnected such as by threads between skirt portion 24 and the upper end of the retaining tube. Stem 3a of valve element 3 is provided with a control passageway 32 axially thereacross and which opens on the underside of diaphragm 10 into a vent chamber 36 through the open lower end of retainer 5 and radially extending ports 37 in the retainer. Lower valve body 2 is provided with a passageway 60 laterally spaced from and parallel to axis A and which receives and supports vent valve element 4 for vertical displacement relative to chamber 36. More particularly in this respect, valve element 4 includes an enlarged head 4a at the upper end thereof, and a stem extending downwardly from head 4a through passageway 60 and including an upper stem portion 4b of a smaller diameter than passageway 60 and a lower stem portion 4c which is of a diameter for sliding interengagement with passageway 60. Lower valve body 2 is provided with an annular vent passageway 38 which is adapted to communicate with vent chamber 36 across valve stem portion 4b of valve element 4 and a radially outwardly extending port 39 extending between passageways 60 and 38. Annular vent passageway 38 is in flow communication with the interior of the tank through a vent port 52 in the upper end of float retainer 7.

The lowermost end 4d of the stem portion of vent valve element 4 is of conical configuration and cooperatively interengages with nose portion 70 of lever arm 6 for controlling the position of valve element 4 in passageway 60 in response to the position of float 8 in retainer sleeve 7. Nose portion 70 includes an arcuate cam surface 70a engaging with stem portion 4d, and the opposite end 72 of lever arm 6 is adapted to slidably interengage with the upper end of float 8 so as to pivot the lever arm clockwise about pivot pin 9 when float 8 rises in retainer 7 and to allow the lever arm to pivot counterclockwise about pin 9 when float 8 descends the retainer. Retainer tube 7 provides a float chamber 42 for float 8, and the bottom of the retainer is provided with an opening 44 of a smaller diameter than the diameter of the float and the sidewall is provided with a port 46 toward the upper end of the float chamber. Opening 44 and port 46 provide for the flow of liquid into and out of float chamber 42 in response to displacement of the float upwardly and downwardly in the chamber.

The operation of valve assembly V will now be described. When the tank is substantially empty, and the valve assembly is open, as shown in FIG. 1, float 8 is positioned in the lower position thereof and lever arm 6 has pivoted counterclockwise about pin 9, whereby cam surface 70a of nose 70 lifts valve 4 to open the upper end of passageway 60 thereby allowing fluid to flow from chamber 36 to chamber 38 and vent port 52 into the tank. In response to the pressure drop in chamber 36, spring 11 biases valve element 3 downwardly from surface 28, thus allowing fluid to flow through inlet passageway 20 and into the tank through outlet passageway 30. As fluid enters the tank, the fluid level rises and fluid enters opening 44 in float retainer 7 and causes float 8 to rise in float chamber 42. The upward movement of the float causes lever arm 6 to pivot clockwise about pin 9, and when the fluid level in the tank reaches the predetermined fluid level, float 8 is positioned in its uppermost position, as shown in FIG. 2. In addition, nose 70 of lever arm 6 moves past stem portion 4d of valve element 4 to the position shown in FIG. 2, thereby allowing the valve 4 to move to its closed position in which head 4a closes the upper end of passageway 60. When valve 4 is in the closed position, fluid cannot flow from chamber 36 to chamber 38 and, as a result, the pressure builds up in chamber 36, which applies pressure to the bottom side of diaphragm 10. As the pressure in chamber 36 increases as fluid flows thereinto from inlet passageway 20 and passageway 32 across valve element 3, valve element 3 is caused to move upwardly until the top of the valve element contacts surface 28, as shown in FIG. 2. Once valve element 3 contacts surface 28, fluid is prevented from flowing into the tank from inlet passageway 20, thereby preventing overfilling of the tank.

Valve assembly V is designed to remain closed after filling, even when the fluid level in the tank drops below the predetermined fluid level. In this respect, the weight of lever arm 6 is insufficient to displace valve element 4 upwardly to its open position against the pressure in chamber 36 when the liquid level in the tank drops and float 8 descends in retainer tube 7 to the broken line position thereof shown in FIG. 2. Thus, nose 70 of arm 6 engages lower end 4d of the stem of valve element 4 and is maintained in the broken line position of the arm shown in FIG. 2 until such time as the supply pressure in entrance passageway 20 is reduced to atmospheric pressure. When the supply pressure is reduced to atmospheric pressure, the pressure in chamber 36 is reduced to atmospheric pressure, spring 11 displaces valve element 3 to the open position thereof shown in FIG. 1, and the weight of lever arm 6 causes the latter to pivot counterclockwise about pin 9, whereby nose 70 of the lever arm causes valve element 4 to move upwardly to the position thereof shown in FIG. 1 in which the upper end of passageway 60 is opened and any liquid in chamber 36 is vented into the tank through port 39, vent chamber 38 and then vent port 52. The valve assembly is then open, whereby the tank can be filled as described hereinabove.

While considerable emphasis has been placed herein on the specific structure of the preferred embodiment of the invention, it will be appreciated that other embodiments can be made and that many changes can be made in the preferred embodiment without departing from the principals of the invention. Accordingly, it is to be distinctly understood that the foregoing descriptive matter is to be interpreted merely as illustrative of the present invention, and not as a limitation thereof.

What is claimed is:

1. A liquid level responsive shut-off valve comprising a valve housing having a first end and an inlet passageway at said first end for connection to a source of liquid under pressure, said inlet passageway having an axis and an outlet end transverse to said axis, a diaphragm actuated valve element coaxial with said axis for opening and closing said outlet end, a spring biasing said diaphragm actuated valve element to open said outlet end, said housing including an outlet passageway laterally adjacent said outlet end for the flow of liquid from said housing when said outlet end of said inlet passageway is open, said diaphragm actuated valve element having a first side facing said outlet end of said inlet passageway and a second side opposite said first side, said housing including a liquid chamber on said second side coaxial with said axis and an outlet port for the flow of liquid in said chamber from said housing, said diaphragm actuated valve element including a flow passageway between said first and second sides and having an inlet end in flow communication with said inlet passageway and an outlet end in flow communication with said liquid chamber, said housing having a second end spaced from said first end, a float retainer mounted on said second end of said housing coaxial with said axis and providing a float chamber having an inner end adjacent said second end of said housing, a float in said float chamber, a float operated lever pivotally mounted in said float chamber between said float and said inner end of said float chamber, a lever operated valve element in said valve housing having open and closed positions for respectively opening and closing said outlet port to the flow of liquid from said liquid chamber through said outlet port in response to the position of said float in said float chamber, said lever operated valve element including an operating end extending from said housing into said float chamber, said lever having an actuating end and an opposite end spaced from said actuating end, said actuating end interengaging with said operating end of said lever operated valve element, said opposite end of said lever slidably engaging said float for said float to pivot said lever as the float ascends and descends in said float chamber, said float at a predetermined lower level in said float chamber engaging said opposite end of said lever for said actuating end of said lever to interengage with said operating end of said lever operated valve element to maintain said lever operated valve element in said open position thereof, whereby liquid under pressure from said source flows through said inlet passageway and through said flow passageway into said liquid chamber and out through said outlet port, said actuating end of said lever disengaging said operating end of said lever operated valve element when said float ascends in said float chamber to a predetermined upper level, whereby said lever operated valve element is released to close said outlet port and liquid under pressure flowing into said liquid chamber through said flow passageway from said inlet passage closes said diaphragm actuated valve element, and said actuating end of said lever including means interengaging with said operating end of said lever operated valve element when said float ascends in said float chamber to said predetermined upper level and the outlet port is closed, the weight of said lever being insufficient to displace said lever operated valve element against the fluid pressure in said fluid chamber to open said outlet port, whereby said means interengaging with said operating end maintains the float operated lever against displacement relative to said operating end as said float descends in said float chamber from said upper level and until said liquid under pressure in said liquid chamber and said inlet passageway is reduced to atmospheric pressure whereupon the weight of said lever displaces said lever operated valve element to open said outlet port.

2. A liquid level responsive shut-off valve comprising a valve housing having a first end and an inlet passageway at said first end for connection to a source of liquid under pressure, said inlet passageway having an axis and an outlet end transverse to said axis, a pressure actuated valve element coaxial with said axis for opening and closing said outlet end, a spring biasing said pressure actuated valve element to open said outlet end, said housing including an outlet passageway laterally adjacent said outlet end for the flow of liquid from said housing when said outlet end of said inlet passageway is open, said pressure actuated valve element having a first side facing said outlet end of said inlet passageway and a second side opposite said first side, said housing including a liquid chamber on said second side coaxial with said axis and an outlet port for the flow of liquid in said chamber from said housing, said pressure actuated valve element including a flow passageway between said first and second sides and having an inlet end in flow communication with said inlet passageway and an outlet end in flow communication with said liquid chamber, said housing having a second end spaced from said first end, a float retainer mounted on said second end of said housing coaxial with said axis and providing a float chamber having an inner end adjacent said second end of said housing, a float in said float chamber, a float operated lever pivotally mounted in said float chamber between said float and said inner end of said float chamber, and a lever operated valve element in said valve housing having open and closed positions for respectively opening and closing said outlet-port to the flow of liquid from said liquid chamber through said outlet port in response to the position of said float in said float chamber, said lever operated valve element including a conical operating end extending from said housing into said float chamber, said lever having cam means at one end thereof and an opposite end spaced from said one end, said cam means interengaging with said conical operating end of said lever operated valve element for displacing said lever operated valve element to open and close said outlet port, said opposite end of said lever slidably engaging said float for said float to pivot said lever as the float ascends and descends in the float chamber, said float at a predetermined lower level in said float chamber engaging said opposite end of said lever for said cam means to interengage with said conical operating end of said lever operated valve element to maintain said lever operated valve element in said open position thereof, whereby liquid under pressure from said source flows through said inlet passageway and through said flow passageway into said liquid chamber and out through said outlet port, said cam means on said lever disengaging said conical operating end of said lever operated valve element when said float ascends in said float chamber to a predetermined upper level, whereby said lever operated valve element is released to close said outlet port and liquid under pressure flowing into said liquid chamber through said flow passageway from said inlet passage closes said diaphragm actuated valve element, and said cam means including a nose portion interengaging with said conical operating end in said closed position of said lever operated valve element and in response to said float ascending in said float chamber to said predetermined upper level, the weight of said lever being insufficient to displace said lever operated valve element against the fluid pressure in said fluid chamber to open said outlet port, whereby said nose portion interengaging with said conical operating end maintains the float operated lever against displacement relative to said conical operating end as said float descends in said float chamber from said upper level and until said liquid under pressure in said liquid chamber and said inlet passageway is reduced to atmospheric pressure whereupon the weight of said lever displaces said lever operated valve element to open said outlet port.

3. A liquid level responsive shut-off valve comprising a valve housing having an inlet passageway for connection to a source of liquid under pressure, an outlet passageway, a diaphragm actuated valve element having open and closed positions respectively opening and closing said inlet passageway to the flow of liquid therethrough to said outlet passageway, said diaphragm actuated valve element having upstream and downstream sides, said inlet and outlet passageways being on said upstream side, a liquid chamber on said downstream side, said diaphragm actuated valve element including a connecting passageway between said upstream side and said chamber, an outlet port for said chamber, a float operated valve element having open and closed positions respectively opening and closing fluid flow communication from said chamber to said outlet port, means including a float and float operated means for displacing said float operated valve element to said closed position thereof when said float is at a predetermined upper level relative to said float operated valve element, said float operated means being between and constantly engaging said float and said float operated valve element, said float at a predetermined lower level in said float chamber engaging said float operated means for said float operated means to interengage with said float operated valve element to maintain said float operated valve element in said open position thereof, whereby liquid under pressure from said source flows through said inlet passageway and through said connecting passageway into said liquid chamber and out through said outlet port, said float operated means disengaging said float operated valve element when said float ascends in said float chamber to said predetermined upper level, whereby said float operated valve element is released to close said outlet port and liquid under pressure flowing into said liquid chamber through said flow passageway from said inlet passage closes said diaphragm actuated valve element, said float operated means being in a first position when said float operated valve element is in said closed position thereof and said float is at said predetermined upper level, said float operated means and said float operated valve element including holding means interengaging in said closed position of said float operated valve element and in response to said float ascending to said predetermined upper level, the weight of said float operated means being insufficient to displace said float operated valve element against the fluid pressure in said fluid chamber to open said outlet port, whereby said holding means maintains the float operated means against displacement relative to said float operated valve element as said float descends from said upper level and until said liquid under pressure in said liquid chamber and said inlet passageway is reduced to atmospheric pressure whereupon the weight of said float operated means displaces said float operated valve element to open said outlet port.

4. A valve according to claim 3, wherein said float operated means includes a lever pivotal by said float about a lever axis to displace said float operated valve element from said open to said closed position.

5. A valve according to claim 4, wherein said lever has a first position when said float operated valve element is in said closed position, said lever including a nose and said float operated valve element including an end interengaging with said nose in said closed position of said float operated valve element for maintaining the said lever in said first position thereof.

* * * * *